(No Model.)

R. N. ALLEN.
CAR WHEEL.

No. 323,551. Patented Aug. 4, 1885.

Witnesses:
R. F. Gaylord
A. B. Jones.

Inventor
Richard N. Allen,
by Paul A. Duncan,
Atty

UNITED STATES PATENT OFFICE.

RICHARD N. ALLEN, OF CLEVELAND, OHIO.

CAR-WHEEL.

SPECIFICATION forming part of Letters Patent No. 323,551, dated August 4, 1885.

Application filed June 24, 1885. (No model.)

*To all whom it may concern:*

Be it known that I, RICHARD N. ALLEN, of the city of Cleveland, county of Cuyahoga, in the State of Ohio, have invented certain new and useful Improvements in Car-Wheels, of which the following is a full, clear, and exact description.

The present invention relates to that class of car-wheels which are composed, essentially, of three distinct parts, the tire, the hub, and an intermediate body or part located between the hub and the tire; and the invention consists in the special construction of the intermediate body of the wheel; also, of the mode of attaching the tire and hub to such intermediate body of the wheel whereby the tire or hub can be easily removed and a new one substituted.

Figure 1:
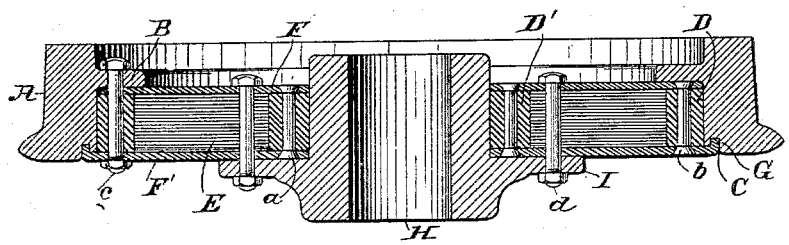
Figure 2:
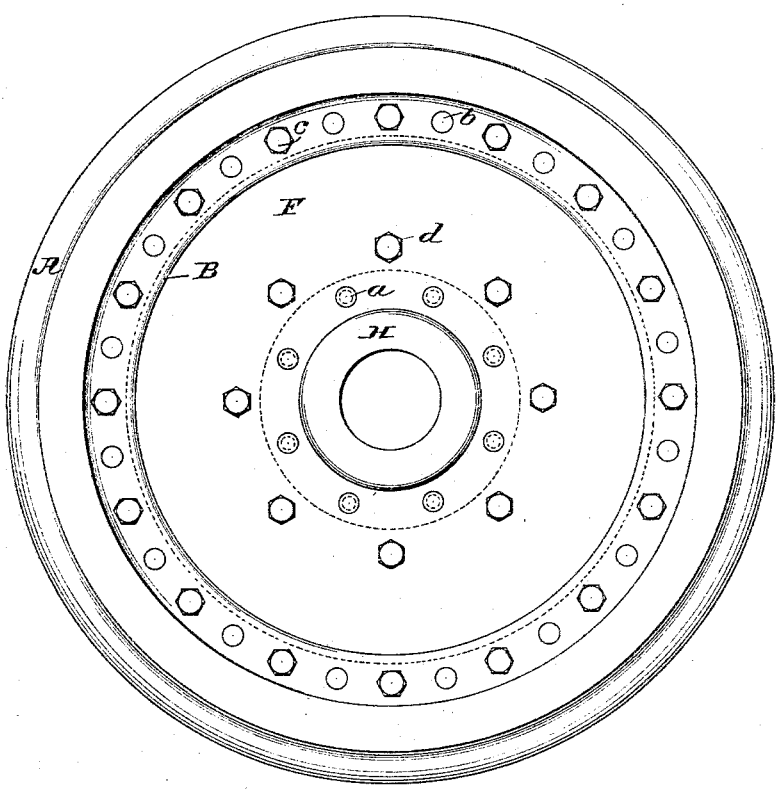

The invention is illustrated in the accompanying drawings, in which Figure 1 is a cross central section of the wheel, and Fig. 2 is a plan view of the outer side or face of the same.

The several parts of the wheel as designated by letters in the drawings are described as follows:

A represents the tire, which is provided with a flange, B, so located as to leave sufficient space between it and the inner edge of the tire to receive the periphery of the body of the wheel. The tire is also provided with a groove, C, upon its inner edge. The intermediate portion or body of the wheel is made up of two metal rings, D and D', preferably of wrought-iron or steel, with a core or disk, E, of compressed paper or other equivalent material forced between them, and surrounded laterally by side plates, F and F', of iron or steel, the several parts above named being firmly bound together by a series of rivets, *a*, passing through the side plates and the ring D' near the hub, and by a series of rivets, *b*, passing through the side plates and the ring D near the tire. The side plate, F', is provided with a flange or tongue, G, at its outer periphery to enter the groove C of the tire, forming the well-known tongue-and-groove lock.

H is the hub of the wheel, and is provided with a flange or web, I, preferably located so as to overlap the surface of the central part of the inner plate, F'.

The several parts composing the body of the wheel are conveniently fashioned and brought together as follows: The rings D and D' are preferably bored and turned upon their outer and inner faces so as to present smooth surfaces to the parts with which they are brought in contact, and so as to make the inner surface of the ring D' fit closely to the hub. The faces should preferably be slightly inclined or beveled, as shown in the drawings, to make a closer fit with the parts which are forced in contact with such surfaces. The edges of these rings should also be turned off smooth and accurately to permit perfect contact with the side plates. The central core or disk, E, preferably of compressed paper, is turned out of a size to fit closely between the rings, and is forced into position between the outer face of the ring D' and the inner face of the ring D by means of hydraulic or other heavy pressure. The side plates, F and F', having the hub aperture somewhat smaller than will be required for inserting the hub, are then brought into position and are held in place temporarily by means of clamps or other devices. The rivet-holes are then bored, and the rivets *a* and *b* are headed down, whereby the side plates are drawn in close contact with the rings and the core. The edges or peripheries of the side plates can now be conveniently bored out and turned off to conform to the surfaces of the rings D' and D, and to fit accurately upon the hub and the tire. After the center or body of the wheel has been thus formed the tire and hub are forced to their respective positions by great pressure, the contact surfaces being preferably slightly beveled to make a closer fit, the tongue G of the inner plate being entered into the groove C of the tire, and the central part of the plate F' being brought in close contact with the overlapping flange I of the hub. Holes for two series of bolts, one passing through the flange B of the tire, the side plates near their outer peripheries, and the ring D, and the other through the side plates, the core E, and the flange I of the hub, are then conveniently bored, and the bolts *c* and *d* are inserted in place and drawn home by means of their nuts, whereby the tire is securely united to the outer periphery of the body of the wheel, and the inner periphery of the body is firmly fastened to the hub.

It is desirable in the above-described wheel that the body portion should be strong and durable, and should also be of such construction as to absorb the shocks and vibrations communicated to the tire, which usually produce a disagreeable noise or ringing in fast-running wheels. It is also desirable that the outer and inner peripheries of the body should be of such material that they will not be abraded, torn, or splintered when the tire or hub is forced off, and thus be rendered unfit for receiving new ones, as is frequently the case when wood, compressed paper, and other soft and yielding material have been used in this position.

In the present construction the metal rings D and D', which, with the peripheries of the side plates, form the bearing or contact peripheries of the body of the wheel with the tire and the hub, not only add materially to its strength and durability, but, when made of wrought iron or steel, are admirably adapted to resist without essential injury the friction incident to forcing them tightly upon the tire and hub and removing them therefrom. Either the tire or the hub, or both, may be removed as many times as may be necessary, and the peripheries of the intermediate body still remain in good condition to receive new tires or hubs.

The core or disk E, interposed between the rings D and D', is preferably made of some material adapted to absorb and destroy sound-producing vibrations communicated from the tire. For this purpose I prefer compressed paper, by reason of its durability and its capacity to resist contraction and expansion under atmospheric changes, and consequently to retain its contact with the rings D and D' and the side plates. A core of wood or leather, preferably made up of several layers with the grains crossed, will answer the same purpose to an inferior degree. The core E is also advantageous in keeping the plates from being drawn too near each other by the series of bolts $d$ next the hub, as would be liable to be the case were no core used. A good and practical wheel may be constructed upon this plan without the use of the core by extending the ring D' outward sufficiently to allow the bolts $d$ to pass through the ring, and in such construction the ring would furnish the abutment of the side plates where the bolts pass.

It is observed that in the construction set forth and shown in the drawings the outer periphery of the body of the wheel is entirely upon one side of the flange B of the tire, and its inner periphery is entirely upon one side of the flange I of the hub. This makes it practically easy to remove the tire or the hub, or both, simply by removing the holding-bolts and forcing the tire or the hub from the body. New tires or hubs of the same size can be forced into position without any change or turning off or boring out of the peripheries of the body.

What is claimed as new is—

1. A car-wheel composed of a tire and a hub united to an intermediate body, which latter consists of an outer and an inner metal ring, and an interposed core secured between two side plates, substantially as and for the purpose described.

2. A car-wheel composed of a tire, a hub, and an intermediate body, the latter being united to the tire by a tongue-and-groove lock, and by a series of bolts passing through the flange B and the outer periphery of the intermediate body, and united to the hub by a series of bolts passing through the inner periphery of the intermediate body and the flange I of the hub, substantially as and for the purpose set forth.

RICHARD N. ALLEN.

Witnesses:
R. F. GAYLORD,
D. H. DRISCOLL.